United States Patent Office 3,431,727
Patented Mar. 11, 1969

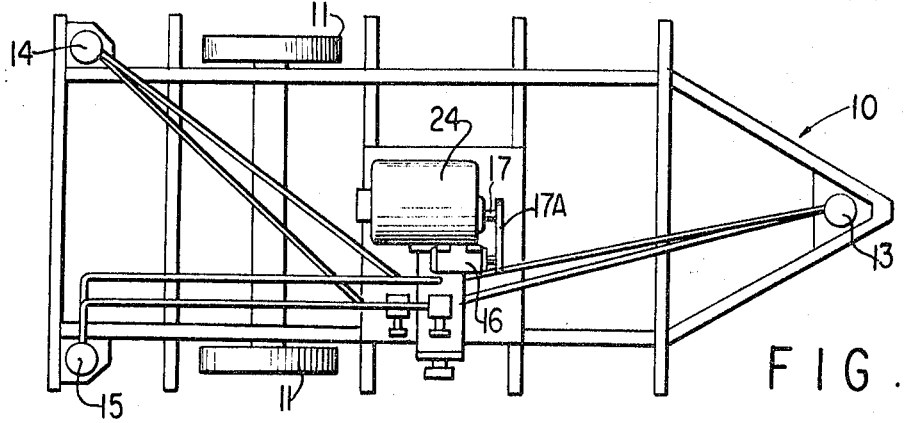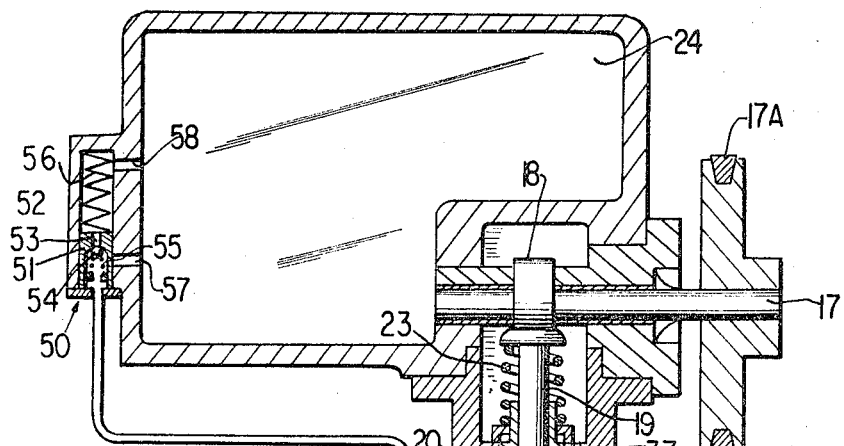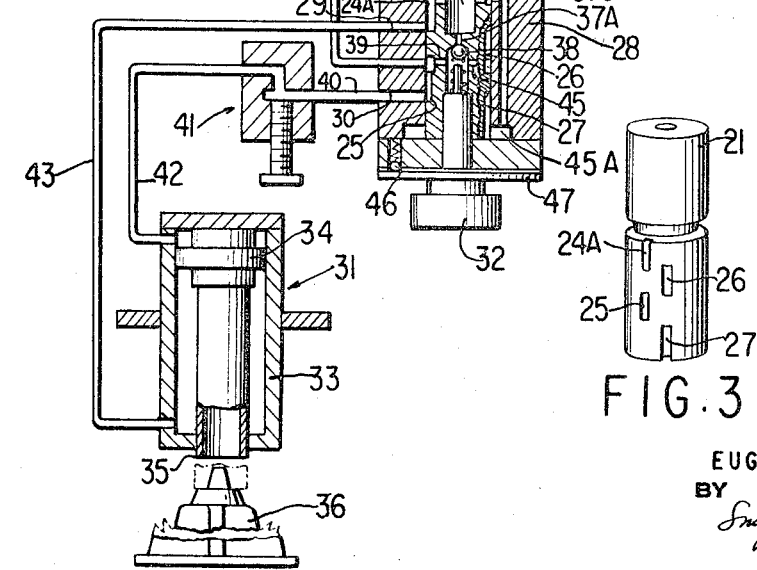

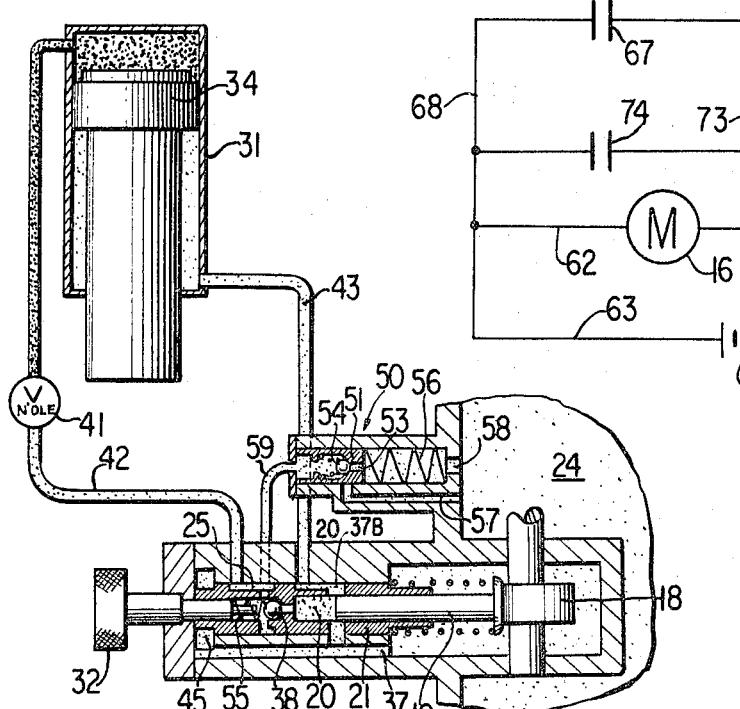

3,431,727
JACK ARRANGEMENT FOR TRAILERS
Eugene V. Grumman, 1337 Burr St.,
Fairfield, Conn. 06430
Continuation-in-part of application Ser. No. 504,974,
Oct. 24, 1965. This application Jan. 18, 1968, Ser.
No. 698,884
U.S. Cl. 60—52                              9 Claims
Int. Cl. F15b 13/06; B60s 9/10

ABSTRACT OF THE DISCLOSURE

A jack arrangement for supporting a trailer, the jacks being operated by supplying fluid pressure thereto, the fluid pressure being controlled by a rotary cylinder in which the piston of a pump reciprocates and means are provided to compensate for surge, overpressure, and cavitation effects; also, a means for sensing level can be included.

*Specification*

The invention relates to house type trailers and particularly to a jack arrangement for supporting the trailer after disconnection from a towing vehicle.

This invention is a continuation-in-part of copending application Ser. No. 504,974, filed Oct. 24, 1965, now abandoned.

House and similar trailers previously have been sometimes supplied with various mechanical types of means to support the tongue end when disconnected from a towing car. Some of these have been in the form of common screw jacks or swingable struts. These have been difficult to operate and often have required crawling under the trailer to operate.

One of the objects of the invention is to provide an integral jack system for a trailer which is easy to operate, has few exposed parts and which eliminates the necessity of crawling under the trailer to operate.

Another of the objects of the invention is to provide a jack system which can be used to level the trailer with ease.

A still further object of the invention is to provide a jack arrangement which does not have exposed mechanical parts and which will not wear out as may be the case with mechanically operated arrangements subjected to road dirt.

In one aspect of the invention, a jack can be mounted at the front or tongue portion of the trailer and a jack can be placed adjacent each of the rear corners of the frame. Each jack can comprise a fluid cylinder and piston therein operable by fluid pressure. In the usual and preferred form, the cylinders will be mounted on the frame with the pistons movable downwardly to engage a jack base placed on the ground. This could be reversed.

In another aspect of the invention, each jack may have a hand-operated pump mounted thereon for pumping fluid from a reservoir to raise that portion of the trailer and suitable valves for releasing fluid.

In a still further aspect of the invention, an anti-surge valve or device is provided so as to inhibit surge effects, limit pressure, and alleviate cavitation effects. Also, a control circuit can be used which will sense level and semi-automatically operate the jacks.

Other objects, advantages and features of the invention will become apparent from the following description and drawings which are merely exemplary.

In the drawings:

FIG. 1 is a top view of the frame of a trailer;

FIG. 2 is a fragmentary sectional view of a motor operated pump and related jack, the valve being in a position to elevate. For clarity in description, the section is not straight across the valve cylinder;

FIG. 3 is an enlarged schematic perspective view of the jack cylinder of FIG. 2 showing the port arrangements;

FIG. 4 is a schematic sectional view of the valve body that cooperates with the cylinder of FIG. 3;

FIGS. 5A, 5B, and 5C are fragmentary enlarged sectional views of the parts in various working positions; and FIG. 6 is a schematic electrical diagram.

Referring to FIG. 1, trailer frame 10 may have conventional wheels 11 mounted thereon. At the tongue or forward portion of the frame, jack means 13 is provided. Jack means 14, 15 are located adjacent the rear corners of the frame. In the form shown in FIG. 2, oil or fluid for the various jacks is supplied by means of a motor driven pump which can be mounted on the frame. Motor 16 is connected to shaft 17 by belt 17A, shaft 17 carrying a pump eccentric or cam 18 (FIG. 2). Pump plunger 19 is reciprocable within cylinder chamber 20 of the rotatable valve cylinder 21. Spring 23 serves to move plunger 19 upwardly. Cylinder 21 is selectively rotatable by knob 32 as will be described hereafter, the cylinder being shown in FIG. 2 in position to furnish fluid for raising one of the jacks.

Reservoir 24 may have fluid therein for use in the system. Cylinder 21 has slots therein as seen in FIG. 3 so as to connect the pump to elevate or retract a selected jack. Slots 24A, 25 are for lowering of a jack and slots 26, 27 are for retraction. The cylinder valve body 28 has sets of ports therein for conduits or pipes leading to each of the jacks.

In FIG. 2, the valve cylinder 21 is turned so that one of slots 24A, 25 register with ports 29, 30 for lifting the trailer jacks 31, knob 32 being provided to turn valve 21 for the selected operation. Jack 31 has a jack cylinder 33 and piston 34. The lower end 35 of piston 34 cooperates with a suitable jack base 36.

As plunger 19 is moved downwardly by eccentric 18, fluid will flow through passage 37 into the cylinder chamber 20. After plunger 19 passes ports 37B, 37C in cylinder 21, connecting passage 37 with chamber 20, fluid will be forced through port 37A past check valve 38 into port 39, slot 25, passage 30, line 40, needle valve 41, and line 42 to the top of piston 34 of jack 31. As the piston 34 is forced downwardly, fluid will return through line 43 to passage 29, slot 24A, and back to the oil reservoir 24.

When it is desired to retract the jack, valve cylinder 21 is turned so that slots 26, 27 come into registry with passages 29, 30. Referring to FIGS. 3 and 4, when there are three sets of pipes leading to three jacks, the angle between the pipes may be 120°. The angle between the pairs of slots can be 60° or a suitable angle so that either the trailer lifting or trailer lowering pairs of slots will register with the respective lines or pipes to the jacks.

When slot 26 is in registry with the passage 29, slots 24 and 25 will be out of registry with the lines to the jack. Reciprocation of plunger 19 will cause fluid to flow past check valve 38 to slot 26 through passage 45, the inner end of which is connected to the space below check valve 38, the valve being shown broken away. This will cause pressure to be exerted through line 43 to force piston 34 upwardly which is a trailer lowering or retracting direction. Exhaust fluid from above piston 34 will flow through line 42, line 40 to port 30 and then to slot 27 which will be in registry therewith. Slot 27 communicates with space 45A which is connected to passage 37 and thence to the reservoir 24. After a jack has been operated, its needle valve 41 can be closed before the cylinder valve is turned for operation of the next jack.

Detent 46 can be used to position knob 32 and plate 47 as desired.

In order to provide a means to inhibit surge effects inherent with the reciprocating pump 18, 19, an antisurge device 50 is provided. Referring to FIGS. 2, 5A, 5B, and 5C, device 50 comprises a slidable piston 51 within cylinder 52. The piston 51 has an aperture 53 and ball check 54 therein, the check 54 being urged upwardly (FIG. 2) by a light spring 55. Spring 56 urges the piston 51 downwardly. Passages 57, 58 connect the interior of cylinder 52 to the reservoir or tank 24.

When the piston 19 is moved downwardly to deliver oil to the jack 31, pressure will also be exerted on piston 51 through line 59 to compress spring 56. Upon movement of piston 19 upwardly, the pressure in chamber 20 drops so that the piston 51, under urgence of spring 56 will deliver some oil to jack 31 as in FIG. 5A. Thus, the surge resulting from reciprocation of piston 19 will be smoothed or damped.

The antisurge valve 50 also serves to prevent an overload in the motor drive and hydraulic system so that when pressure reaches a predetermined point or value, piston 51 will move upwardly to uncover port 57. FIG. 5B shows the parts as they would be when maximum pressure is exerted so as to open the port. This will limit the load on the hydraulic system.

When the trailer has been jacked up and levelled for some time and it is desired to lower the trailer, the possibility exists that piston 19 will cover both ports 37B and 37C. At this time, needle valve 41 is open, but there is no communication from jack 31 through line 43 and port 29 to the reservoir 24. The weight on the jack caused by the trailer results in piston 34 acting as a pump attempting to force oil out through line 43 and to bring oil in through line 42. The resultant effect will be severe cavitation in the space above piston 34 in cylinder 31. To prevent such a cavitation, ball check valve 54 in piston 51 will now permit communication from reservoir 24, port 58, passage 53, past check 54 to line 59 and in turn to the topside of jack piston 34 so as to alleviate the cavitation effect.

Referring to FIG. 5A, parts being given reference numerals similar to FIGS. 2, 3, and 4 when appropriate, the valve is in lifting position so as to lift the trailer.

Referring to FIG. 6, an electrical circuit for semiautomatic levelling operation is shown wherein the motor 16 is connected to a source of power 61 through leads 62, 63. The other side of the motor 16 is connectable to selector switch 64 for manual operation when moved to contact 65 or to semiautomatic operation when moved to contact 66. Longitudinal position or level sensor 67 is connected in lead 68 through selector 69, to relay coil 70, and thence through lead 71 and contacts 72 to the other side of motor 16 and source of power 61. When selector switch 69 is moved onto contacts 72 and the trailer is not level, valve 21 being set to elevate or lift the trailer, the motor 16 will operate until the longitudinal angle sensor 67 is satisfied. Sensor 67 can be a conventional mercury switch as used in the art for sensing angular displacement of elements.

After the longitudinal axis is set, the needle valve for the front or other jack can be closed. Then the next jack needed for transverse levelling can be selected and the operation repeated by moving switch 69 to contact 73. Transverse sensor 74 will then be in the circuit which, when satisfied, will stop the motor.

It should be apparent that changes may be made in details of construction or arrangement of parts without departing from the spirit of the invention except as defined in the appended claims.

What is claimed is:

1. In a jack arrangement for a trailer, the combination comprising a frame having front and rear portions, at least one jack means mounted adjacent the front portion of said frame, and jack means mounted adjacent each of the rear side portions of said frame, a hydraulic pump cylinder mounted on said frame and having a fluid reservoir associated therewith, a rotatable valve cylinder having an elongated bore, said valve cylinder being mounted in said pump cylinder, a pump plunger reciprocable in said bore, eccentric means for engaging and reciprocating said pump plunger, motor means on said frame for rotating said eccentric means, passages in said pump cylinder connectable by conduits to each of said jack means, spaced pairs of slots in said valve cylinder whereby upon manual rotation of said cylinder, one pair of slots will be caused to register with said passages to conduct fluid through said conduits to at least one of said jack means for positively raising or lowering said selected jack means.

2. A jack arrangement as in claim 1 wherein there is a closeable needle valve in the conduits to said jack means whereby said jack means may be rendered operable or inoperable.

3. A jack arrangement as in claim 1 wherein there is an antisurge valve means connected between said bore and said reservoir for inhibiting fluid surges.

4. A jack arrangement as in claim 3 wherein there is an overpressure relief means associated with said antisurge valve means.

5. A jack arrangement as in claim 4 wherein there is an anticavitation relief connected to said valve means.

6. A jack arrangement as in claim 1 wherein there is a selectively operable automatic and manual control circuit for said motor.

7. In a jack arrangement for a trailer, the combination including a frame having front and rear portions, at least one jack means mounted adjacent the front portion of said frame, jack means mounted adjacent each of the rear side portions of said frame, hydraulic pump means with a fluid reservoir associated therewith, a motor connected to said hydraulic pump means, rotatable valve cylinder means having pump plunger means reciprocable relative thereto associated with the pump means and having means connecting said pump means and reservoir selectively to said jack means, level sensing means, means connecting said level sensing means to said motor for stopping the same when a predetermined trailer level has been attained.

8. A jack arrangement as in claim 7 wherein there are at least two level sensing means arranged to sense levels at angularly displaced axes.

9. A jack arrangement as in claim 7 wherein the valve cylinder means is rotatable and said pump cylinder is connectable by conduits to said jack means, the valve cylinder means having spaced staggered pairs of slots, so that upon manual rotation of said cylinder means, one pair of slots will be caused to register with passages to conduct fluid to at least one of the jack means.

References Cited

UNITED STATES PATENTS

| | | | |
|---|---|---|---|
| Re. 19,694 | 9/1935 | Ernst | 60—52 |
| 1,538,167 | 5/1925 | Chappell et al. | 60—52 XR |
| 1,557,385 | 10/1925 | Tastenhoye | 60—52 XR |
| 1,743,005 | 1/1930 | Resler | 60—52 XR |
| 1,765,249 | 6/1930 | Tastenhoye | 60—52 XR |
| 1,969,408 | 8/1934 | Kramer et al. | 60—52 |
| 2,103,530 | 12/1937 | Henry | 60—52 XR |
| 2,310,930 | 2/1943 | Blanchett. | |
| 2,499,563 | 3/1950 | Bill | 60—97 |
| 2,680,017 | 6/1954 | McLeod | 60—52 XR |

EDGAR W. GEOGHEGAN, *Primary Examiner.*

U.S. Cl. X.R.

60—97; 254—86; 280—43.23